United States Patent [19]

Matsuda

[11] Patent Number: 5,126,917
[45] Date of Patent: Jun. 30, 1992

[54] GAS INSULATED SWITCHGEAR
[75] Inventor: Setsuyuki Matsuda, Hyogo, Japan
[73] Assignee: Mitsubishi Denki Kabushiki Kaisha, Tokyo, Japan
[21] Appl. No.: 686,926
[22] Filed: Apr. 18, 1991
[30] Foreign Application Priority Data Apr. 20, 1990 [JP] Japan .................. 2-102994

[51] Int. Cl.⁵ .............................. H02B 5/00
[52] U.S. Cl. ...................... 361/333; 361/341
[58] Field of Search ............ 361/331, 332, 333, 335, 361/341, 342, 361

[56] References Cited

U.S. PATENT DOCUMENTS

| 4,237,520 | 12/1980 | Oishi et al. | 361/335 |
| 4,262,323 | 4/1981 | Yoshida | 361/341 |
| 4,428,027 | 1/1984 | Ohyama et al. | 361/341 |

FOREIGN PATENT DOCUMENTS

| 0010564 | 5/1980 | European Pat. Off. |
| 0122728 | 10/1984 | European Pat. Off. |
| 3410555 | 10/1985 | Fed. Rep. of Germany ...... 361/341 |
| 1024131 | 3/1966 | United Kingdom |
| 1100702 | 1/1968 | United Kingdom |
| 1424412 | 2/1976 | United Kingdom |

OTHER PUBLICATIONS

"Mitsubishi Denki Technical Report", vol. 51, No. 6, p. 379.

Primary Examiner—Gregory D. Thompson
Attorney, Agent, or Firm—Burns, Doane, Swecker & Mathis

[57] ABSTRACT

A gas insulated switchgear includes main bus bars disposed vertically and branch circuit units connected to and spread horizontally from the main bus bars, the branch circuit units each comprising disconnecting switches, circuit breakers, current transformers, bushings or cable heads. Both the improvement of reliability and an outstanding economic effect can be attained by a simple structure.

4 Claims, 3 Drawing Sheets

GAS INSULATED SWITCHGEAR

BACKGROUND OF THE INVENTION

1. Field of the Invention

The present invention relates to a gas insulated switchgear for use in a substation, etc.

2. Description of the Prior Art

FIG. 5 illustrates a conventional gas insulated switchgear which is described on page 379 of "Mitsubishi Denki Technical Report," Vol. 51, No. 6. In this conventional switchgear, main bus bars 1A, 1B and 1C are of A, B and C phases, respectively, (also in the following description A, B and C represent phases) and are disposed horizontally, while branch bus bars 2A, 2B and 2C are connected to the main bus bars 1A, 1B and 1C, respectively, each at the portion m and are disposed on a plane located higher than the main bus bars. To the end portions of these branch bus bars are connected disconnecting switches 3A, 3B, 3C, current transformers 4A, 4B, 4C, and circuit breakers 5A, 5B, 5C. To the portion illustrated on the lower, left end side of the figure are further connected current transformers 4A, 4B, 4C, disconnecting switches 3A, 3B, 3C, bushings 6A, 6B, 6C, and lightning arresters 7A, 7B, 7C. The bushings 6A, 6B, 6C are connected to transmission lines 8A, 8B, 8C. A unit comprising the disconnecting switches 3A, 3B, 3C, current transformers 4A, 4B, 4C, circuit breakers 5A, 5B, 5C, bushings 6A, 6B, 6C, and lightning arresters 7A, 7B, 7C, is called a transmission line unit, which is represented by L.

On the other hand, in the portion illustrated on the upper left side of the figure, further connected to the circuit breakers 5A, 5B, 5C are current transformers 4A, 4B, 4C, lightning arresters 7A, 7B, 7C, and cable head portions 9A, 9B, 9C, to which are connected cables 10A, 10B and 10C. Since a transformer is provided at the front ends of those cables, this unit is called a transformer unit, indicated at T. The unit illustrated in the central lower portion of FIG. 5 comprises disconnecting switches 3A, 3B, 3C, current transformers 4A, 4B, 4C, and circuit breakers 5A, 5B, 5C, and functions to electrically divide the main bus bars, so is called a bus bar section unit, indicated at S.

In this construction, electric power is fed from a generator provided at the front end of the transformer connected to the transformer unit T and is supplied to the constituent units through the main bus bars 1A, 1B and 1C, then is transmitted to transmission lines from the transmission line unit L. In some case, the above construction is used as a power receiving equipment wherein electric power is received from the transmission line unit L and then fed to each transformer unit T through the main bus bars 1A, 1B and 1C. As the case may be, the circuit breakers and disconnecting switches of the bus bar section unit S are opened and the main bus bars 1A, 1B and 1C are operated as independent circuits. Further, in the event of a fault, the circuit breakers are opened to isolate the fault point, while the operation of a sound portion is continued.

Since the conventional gas insulated switchgear is constructed as above, a relatively wide ground area is required and it is necessary to use long main and branch bus bars, thus leading to the increase of cost. Besides, the probability of failure becomes larger because of a very long electrical insulating portion. Further, there is the problem of deteriorated dielectric strength caused by the inclusion of metallic particles into gas. The bus bars arranged horizontally are apt to be influenced thereby.

SUMMARY OF THE INVENTION

The present invention has been accomplished for overcoming the above-mentioned problems and it is the object thereof to provide a gas insulated switchgear capable of being installed at a small ground area, permitting the use of shorter main and branch bus bars and the reduction of cost, and further capable of being improved in reliability.

In the gas insulated switchgear according to the present invention, main bus bars are provided vertically, and branch units connected to the main bars and comprising disconnecting switches, circuit breakers and current transformers are drawn out horizontally from the main bus bars.

In the present invention, it is possible to shorten bus bars, and since main bus bars are disposed vertically, metallic particles which causes deterioration of the gas dielectric strength can be dropped and trapped in a low electric field portion at the bottom of each main bus bar.

DETAILED DESCRIPTION OF PREFERRED EMBODIMENTS

Figure 1:
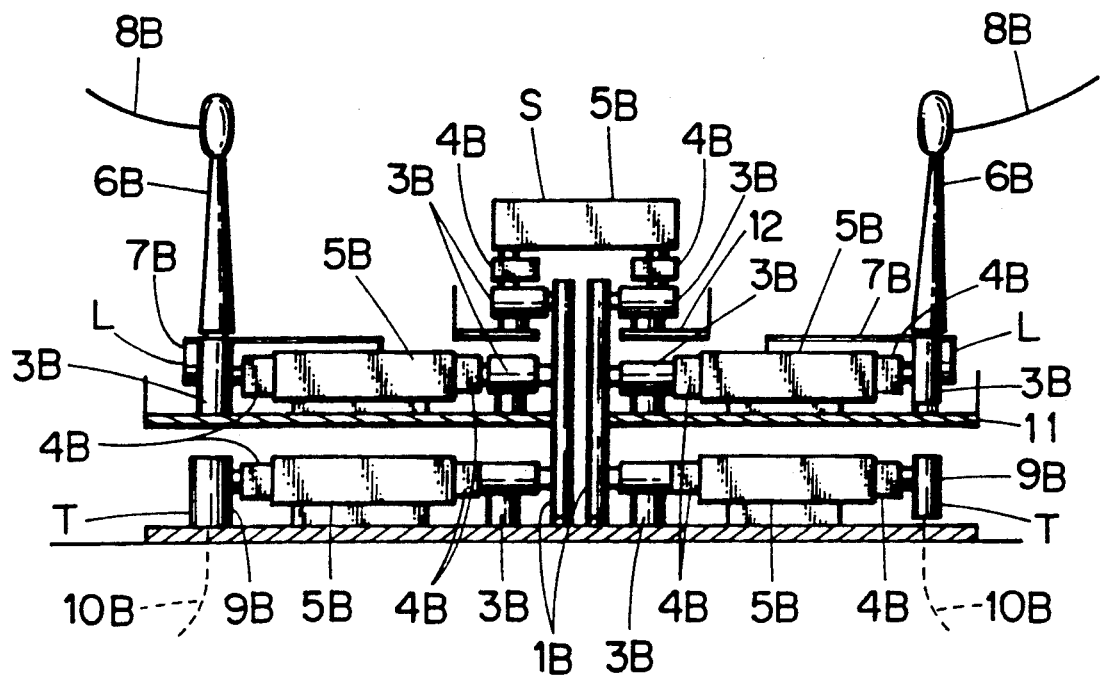
FIGS. 1 and 2 are a side view and a plan view, respectively, of a gas insulated switchgear according to an embodiment of the present invention.

An embodiment of the present invention will now be described with reference to FIGS. 1 and 2. The reference numerals in these figures are the same as in FIG. 5. A main bus bar 1A of A phase, and main bus bars 1A, 1B, 1C are disposed vertically, and a transmission line unit L is disposed on the second floor so as to extend horizontally outwards form the main bus bars while being supported by a rack 11. Further, using a rack 12, a bus bar section unit S is disposed on the third floor in such a manner that it spans the main bus bars 1A, 1B, 1C. On the first floor there is provided a transformer unit T, which is connected to a transformer (not shown) through cable head 9B and cable 10B.

Figure 5:
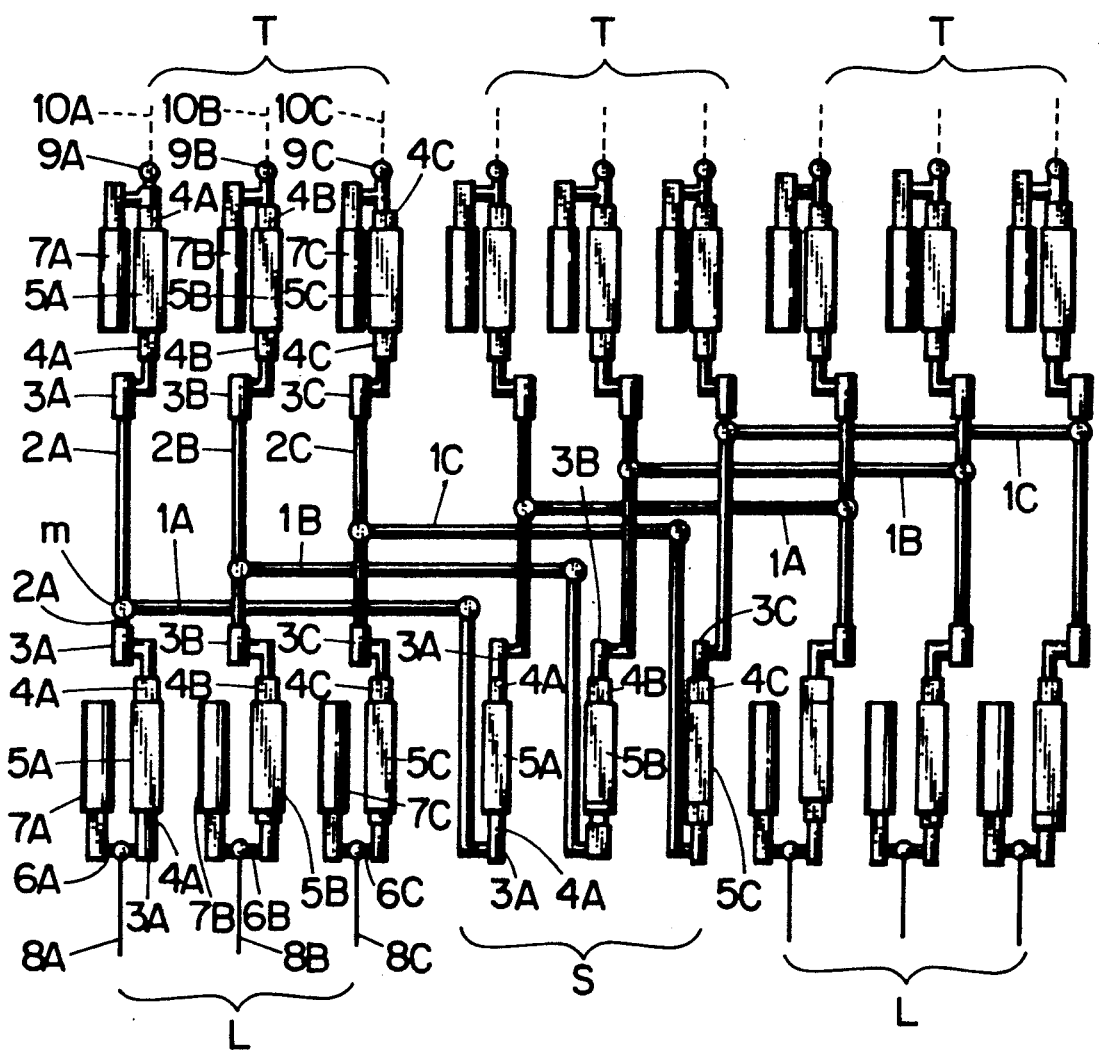
FIG. 5 is a plan view of a conventional gas insulated switchgear.

The operation of the gas insulated switchgear having the above construction is the same as in FIG. 5. Between aerial transmission lines 8A, 8B, 8C and cables 10A, 10B, 10C, the switchgear performs the transmission and reception of electric power while switching over circuits from one to another, and in the event of a fault, it isolates a fault point, using circuit breakers.

In addition to these functions, the switchgear of this embodiment involves the following special operation.

Figure 2:
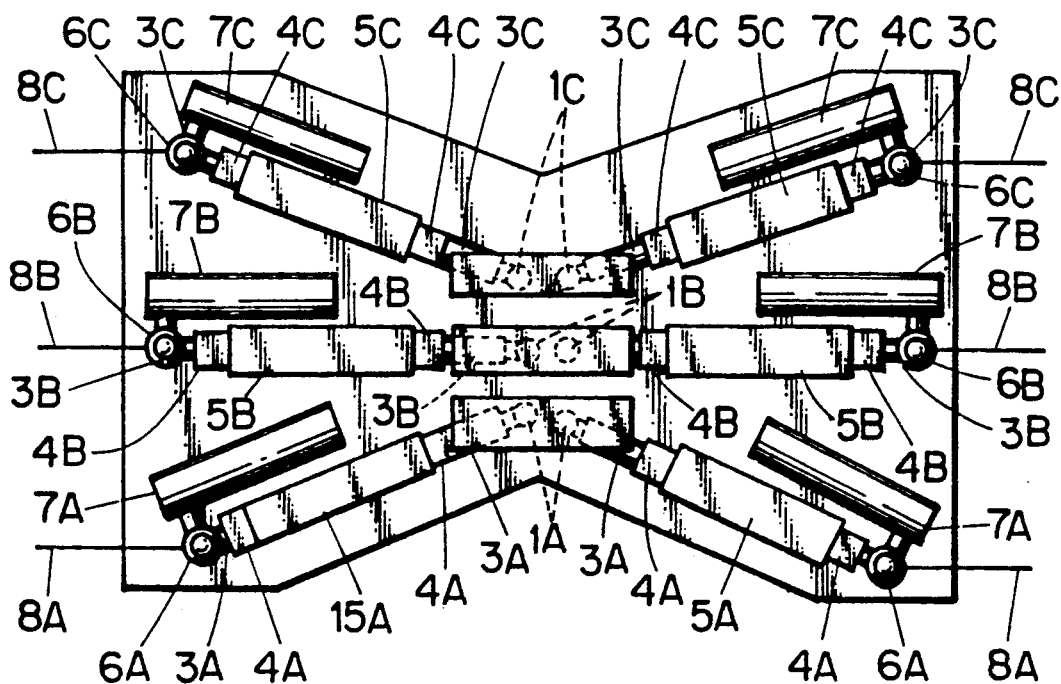

As can be seen from a comparison between FIGS. 1, 2 and FIG. 5, the main bus bars 1A, 1B and 1C are very short, and branch bus bars 2A, 2B and 2C are not needed. Therefore, a great reduction in cost can be attained despite of an additional expense for the racks 11 and 12. Further, the probability of failure decreases and the reliability improves.

Moreover, because of a multi-stage construction, the installation area required is very small, about one-fifth of that in FIG. 5. Thus, the switchgear of this embodiment is very advantageous in substations located in the suburbs of cities where the price of land is high.

Additionally, since the main bus bars are disposed vertically, if a low electric field portion is formed in the lower portion of each main bus bar, metallic particles which badly affects the gas insulation are trapped in that low electric field portion, so the deterioration of the insulating performance is prevented and there can be attained a high reliability. Such low electric field portion can be formed in a simple manner, for example by slightly lengthening the container of each main bus bar downwards.

Figure 3:
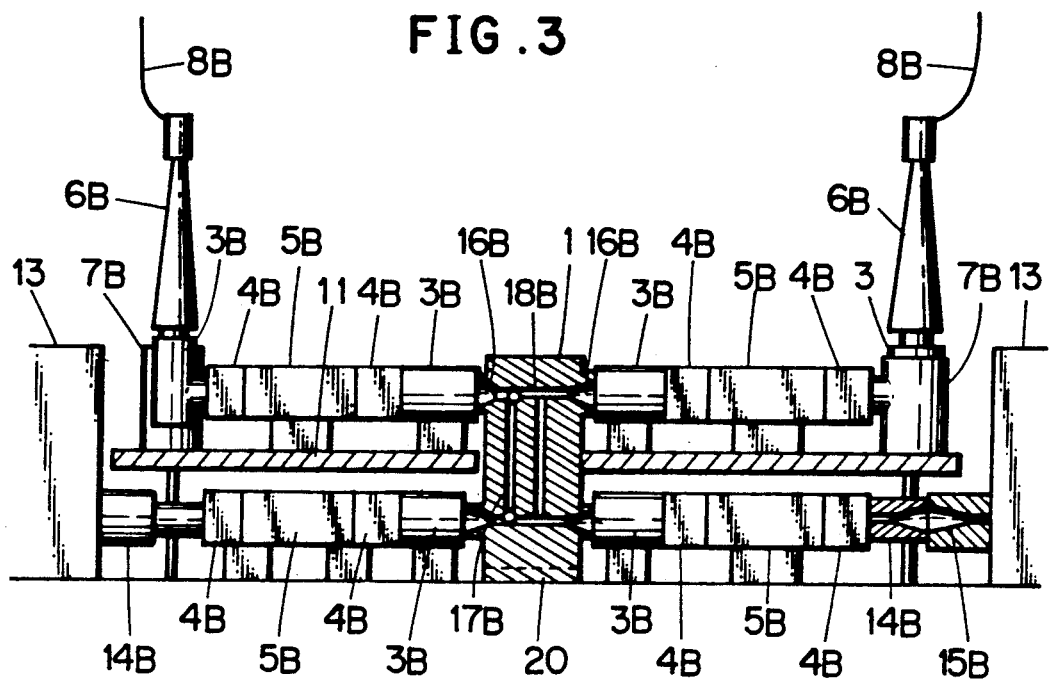
FIGS. 3 and 4 are a partially sectional side view and a partially sectional plan view, respectively, of a gas insulated switchgear according to another embodiment of the present invention.
Figure 4:
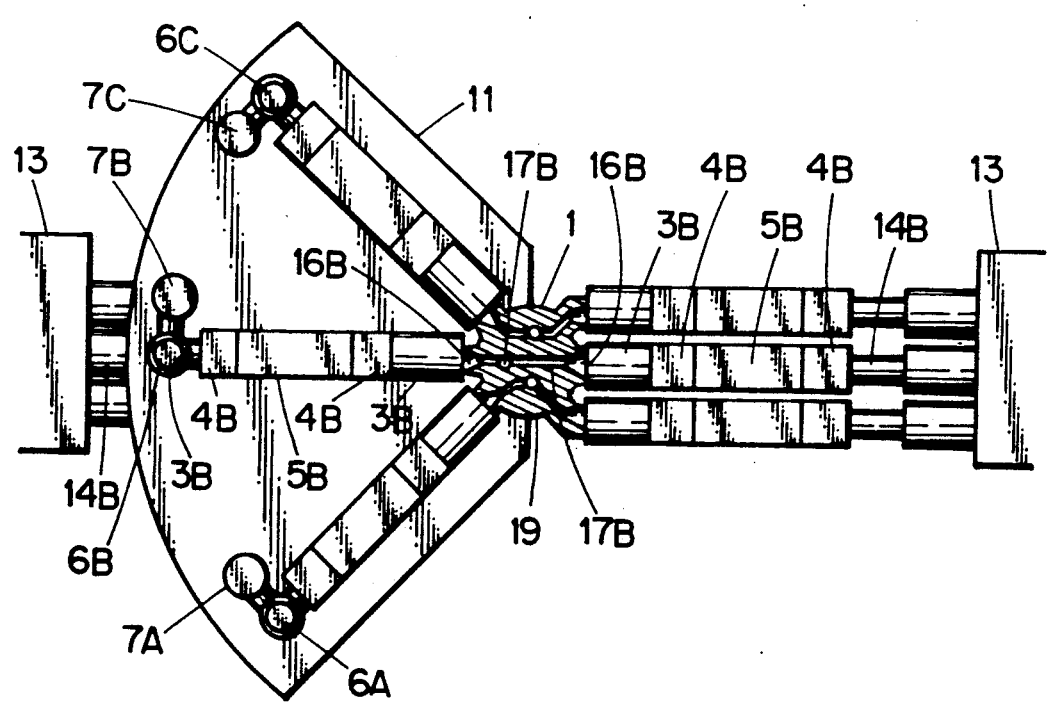

Although in the main bus bars 1A, 1B and 1C used in the above embodiment are of a phase separation type, there may be used a three-phase integral type main bus bar 1. In FIG. 4, the left-half plan view illustrates the second floor portion in FIG. 3, while the right half illustrates the first floor portion. In this embodiment there are used two sets of aerial transmission line units L and two sets of transformer units T. Direct connection is made to a transformer 13 through gas-oil bushings 15A, 15B and 15C in connections 14A, 14B and 14C. In the spaces among bushings 6A, 6B and 6C of each unit it is necessary to provide a large insulation distance in the air, but if the devices of the constituent units are disposed radially from the central main bus bar, a sufficient inter-bushing distance can be ensured by the construction of only the devices without using extra branch bus bars. This is economical.

When the vertical bus bars are supplied with electric current, the gas which has been heated is accumulated in the top portion, so by providing radiation fins in the top container portion to improve the radiation of heat, whereby the electrifying ability can be improved.

If branch lines of each phase are spread symmetrically right and left in FIG. 4 from this three-phase integral type bus bar, the conductor of each phase of the main bus bar can be supported by the two right and left branch conductors each supported by an insulator. Thus, a strong support can be attained and this is convenient.

For the three-phase integral type main bus bar 1 there also may be used a three-phase integral type of devices (circuit breakers, disconnecting switches, etc.) as branch unit devices, whereby a further reduction in size of the switchgear can be attained.

According to this embodiment, the main bus bar 1 is very short and thus permits a very simple structure. Therefore, as the design for insulation of the main bus bar portion, the adoption of a higher insulation design as compared with the other portion can be attained by only a slight increase of cost. Also, a higher voltage withstand characteristic can be attained by making insulating spacers 16B which support conductors 17B of the main bus bar and a container 19 of the main bus bar a little larger than the other unit portions. As the case may be, the voltage withstand performance can be improved by making the gas pressure higher than that in the other portion. A fault of the main bus bar portion might lead to the stop of function of the entire substation. Besides, since the main bus bar portion is positioned centrally of the switchgear, which place is difficult to repair, it is effective for the improvement of reliability to adopt a higher insulation design for the main bus bar portion in comparison with the other portion.

If at the bottom of the main bus bar 1 there is provided a particle trap 20 like a wire net which permits metallic particles to pass therethrough and which is connected to the main bus bar container and grounded, metallic particles in the interior of the bus bar drop into the space between the particle trap 20 and the container wall, whereby there can surely be attained a main bus bar 1 free of floating caused by static electric force and also free of deterioration of insulation performance caused by the metallic particles.

According to the present invention, as set forth above, since main bus bars are disposed vertically and branch units are arranged horizontally, the main bus bars are shortened, the deterioration of insulation characteristic is prevented, and the reliability can be improved. Further, the installation area is reduced and thus there also can be attained a great economic merit.

I claim:

1. A gas insulated switchgear comprising:
main bus bars disposed vertically;
transformer units to be connected to transformers, said transformer units extending horizontally from said main bus bars and disposed on a floor, said transformer units each comprising disconnecting switches, current transformers, and circuit breakers; and
transmission line units having bushings in air to be connected to aerial transmission lines, said transmission line units extending horizontally radially from said bus bars, disposed on a floor above the floor on which the transformer units are disposed.

2. A gas insulated switchgear as claimed in claim 1, wherein bus bar section units are disposed on a floor above the floor on which the transmission line units are disposed and connected to respective said main bus bars.

3. A gas insulated switchgear as claimed in claim 1 or 2, wherein said main bus bars include three-phase integral type bus bars.

4. A gas insulated switchgear as claimed in claim 1 or 2, wherein said main bus bars include phase separation type bus bars and said bus bars of each phase are adjacent to each other.

* * * * *